INVENTORS
ZOLTAN BECK
PETER TOTH

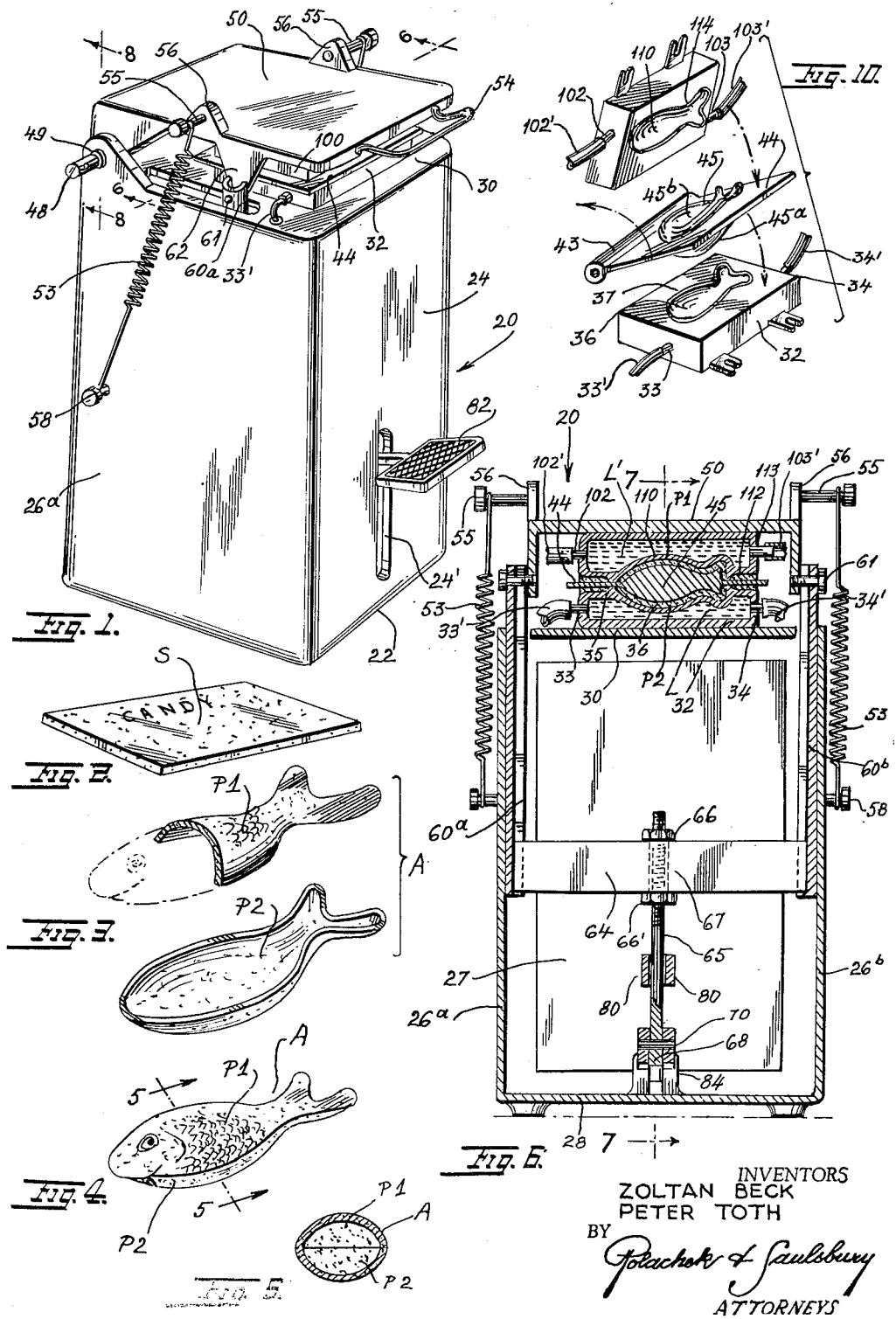

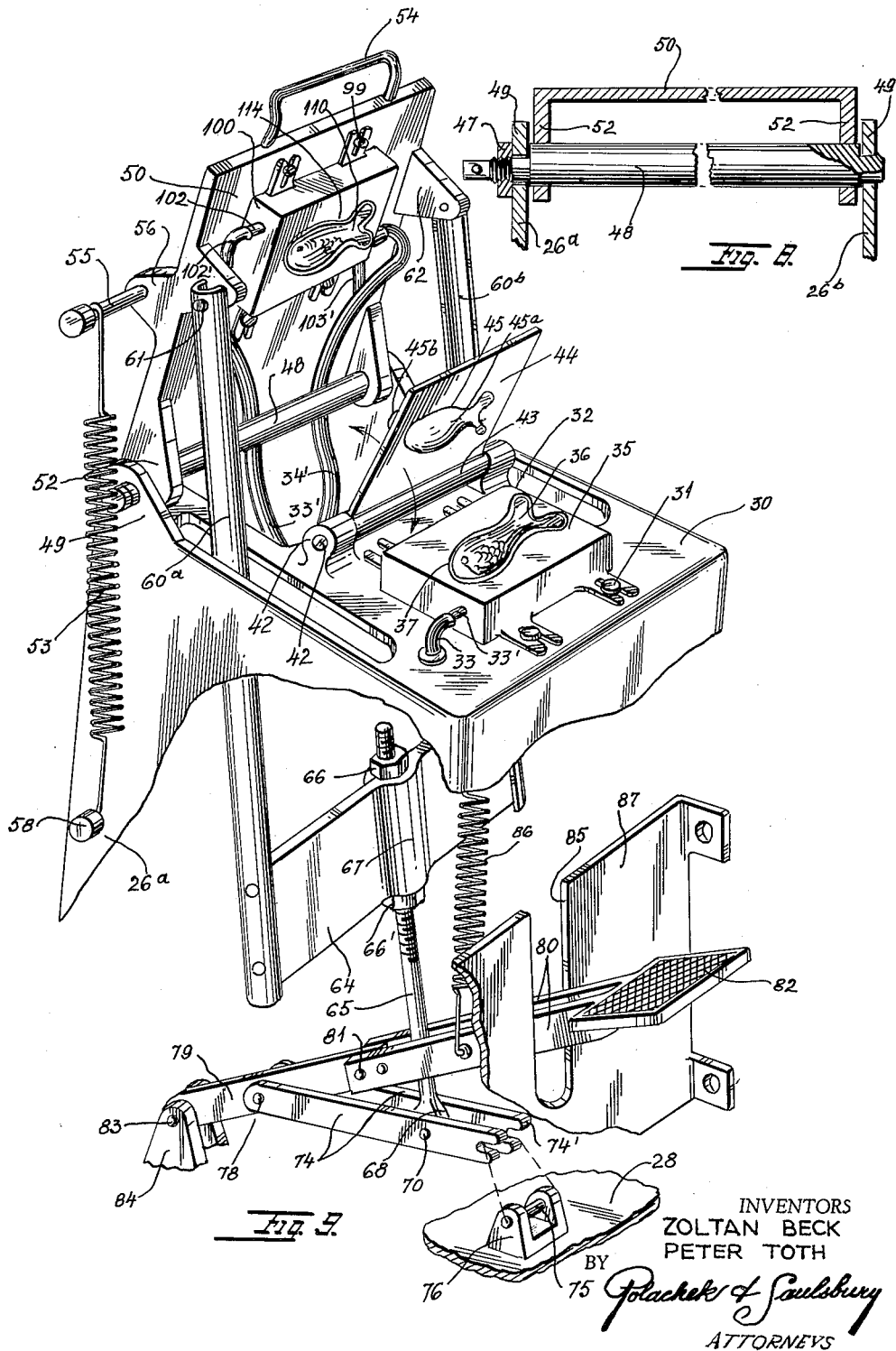

July 20, 1965 Z. BECK ETAL 3,195,479
AUTOMATIC MACHINE FOR MAKING HOLLOW CANDY FIGURES
Filed July 22, 1963 4 Sheets-Sheet 4

INVENTORS
ZOLTAN BECK
PETER TOTH
BY
Polachek & Saulsbury
ATTORNEYS.

3,195,479
AUTOMATIC MACHINE FOR MAKING
HOLLOW CANDY FIGURES
Zoltan Beck, 662 Eastern Parkway, and Peter Toth,
210 E. 51st St., both of Brooklyn, N.Y.
Filed July 22, 1963, Ser. No. 296,795
2 Claims. (Cl. 107—15)

This invention relates to a candy making machine, and more particularly concerns a machine for making hollow candy figures from flat confectionery sheets.

According to the invention, the machine has a stationary first female mold member upon which a pliable, warm confectionery sheet may be placed. A mold plate having double male mold portions extending out of opposite sides thereof is pivotally mounted so that one side can overlay the mold plate with the female mold member receiving one of the male mold portions. A second pliable, warm confectionery sheet can be placed over the other side of the mold plate. A movable second female mold member is pivotally mounted to overlay the mold plate and receive the other male mold portion. Pedal operated levers are provided to press the movable mold member down on the mold plate and first mold member with the confectionery sheets in a warm adhesive condition therebetween. The sheets are impressed with the shapes of the male mold members. The movable female mold member with a formed confectionery portion thereon can then be raised. The mold plate can then be turned out of the way. The two female mold members with molded confectionery portions thereon can then be pressed together to join the molded confectionery portions. Each of the mold members is preferably hollow and provided with means for circulating cold water therethrough to cool and set the confectionery material to form a complete hollow candy figure. Ridges may be provided on the mold members to effect a cutting off of excess confectionery material from the sheets when the second female mold member is initially pressed down on the mold plate or is subsequently pressed down on the first female mold member.

It is therefore one object of the invention, to provide a candy making machine including fixed and movable female mold members with a pivotable mold plate having male mold portions on opposite sides.

Another object is to provide a candy making machine as described, with confectionery material therebetween, pedal operated means for pivoting and pressing the mold members together.

A further object is to provide a candy making machine as described wherein the mold members are hollow and have means for circulating water therethrough to set the confectionery material.

For further comprehension of the invention, and of the objects and advantages thereof, reference will be had to the following description and accompanying drawings, and to the appended claims in which the various novel features of the invention are more particularly set forth.

FIG. 1 is a perspective view of a candy making machine embodying the invention.

FIG. 2 is a perspective view of a confectionery sheet.

FIG. 3 is a perspective exploded view of a pair of molded confectionery pieces.

FIG. 4 is a perspective view of a molded candy figure as made by the machine of FIG. 1.

FIG. 5 is a sectional view taken on line 5—5 of FIG. 4.

FIG. 6 is a sectional view taken on line 6—6 of FIG. 1.

FIG. 8 is a sectional view on an enlarged scale taken on line 8—8 of FIG. 1, parts being broken away.

FIG. 9 is a perspective view on enlarged scale of the machine with movable mold member and mold plate shown in open position, parts of the machine being broken away.

FIG. 10 is an exploded perspective view of the female mold members and mold plate in open positions.

Figure 7:
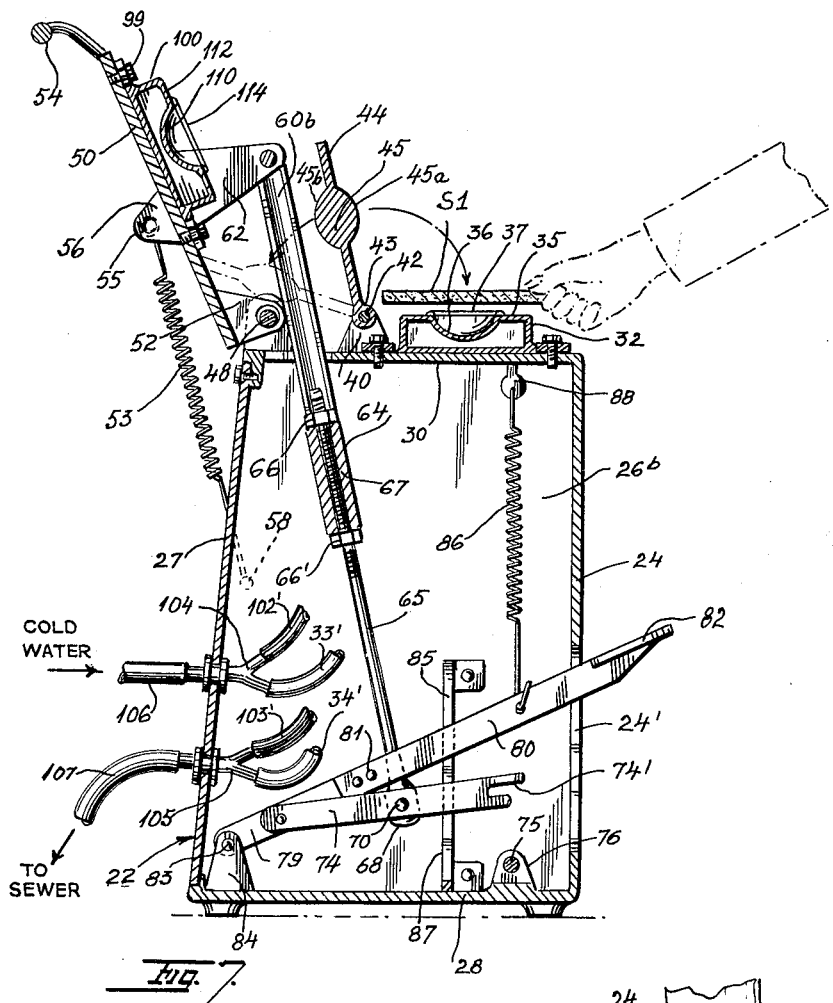
FIG. 7 is a sectional view taken on line 7—7 of FIG. 6, with movable mold member and mold plate shown in open positions.

Referring first to FIGS. 1 and 6–13, there is shown the machine 20 including a rectangular frame base 22 with vertical front wall 24, side walls 26$^a$, 26$^b$, rear wall 27, bottom 28 and top plate 30. Mounted on the top plate 30 in a fixed position maintained by bolts 31 is a horizontal female mold member 32. This member is a hollow container having inlet and outlet nipples 33, 34 for circulating liquid L therethrough; see FIG. 6. The upper side 35 of the mold member is formed with a recess or cavity 36. The upper side 35 may have a ridge 37 extending all around the cavity 36. Pipes 33', 34' are attached to nipples 33, 34, respectively.

A pair of trunnions 40 are disposed behind the mold member 32. These trunnions engage ends of a pivotable shaft 42 in sleeve 43 at one edge of a rectangular mold plate 44. The mold plate has an integrally formed mold 45 which extends outwardly of opposite sides of the plate to define two male mold portions 45$^a$, 45$^b$. Mold portion 45$^a$ can be inserted into cavity 36 as shown in FIG. 6, when the mold plate is in a closed position overlaying the mold member 32.

A shaft 48 is horizontally carried by upper extensions 49 of side walls 26$^a$, 26$^b$ of the base 22 and is secured by nuts 47. On the shaft is pivotally mounted a press plate 50. This plate has depending ears 52 engaged rotatably with respect to shaft 48; see FIG. 9. The bores of the ears are larger in diameter than the diameter of the shaft 48 so that the shaft is adapted to move relative to the ears. The press plate has a handle 54 at its forward edge for manually grasping and lowering the plate 50. The plate 50 is held in a normally elevated position by two coil springs 53 engaged on pins 55 extending laterally of outwardly extending ears 56 of plate 50.

Lower ends of springs 53 are engaged on anchoring pins or bolts 58 secured to the side walls 26$^a$, 26$^b$.

In order to exert a pressing operation with plate 50 there are provided lateral bars 60$^a$, 60$^b$ pivotally secured by pins 61 to opposing depending ears 62 on opposite edges of plate 50. At the lower ends of bars 60$^a$, 60$^b$ is a cross plate 64 to which is attached a bolt link 65. This link has adjustment nuts 66, 66' on its upper threaded end. The bolt link passes through a sleeve 67 formed integrally with plate 64. The lower end of link 65 has an eye 68 pivotally engaged on a pintle 70. This pintle is anchored in spaced links 74 having forward fingers 74' to engage on a stationary horizontal stop pin 75 carried in a bracket 76 at the bottom 28 of the base; see FIG. 9.

The other ends of links 74 are engaged with a pintle 78 near one end of a pedal assembly including a bar 79 and two spaced pedal bars 80. Bars 80 terminate in a pedal plate 82 and are secured by bolts or rivets 81 to the forward end of bar 79. The rear end of bar 79 is pivotally secured by a pintle 83 to a bracket 84 secured to the bottom 28 of the base. The bar assembly constituted by bars 79 and 80 function as a lever and said lever constitutes part of lever operated means including bars 60$^a$ and 60$^b$, cross plate 64 and links 65 and 74.

Pedal bars 80 extend through a slot 85 formed in a frame plate 87 in base 22. Bars 80 extend through slot 24' in front wall 24 of base 22. A coil spring 86 is connected at its lower end to one of bars 80, and at its upper end spring 86 is secured to an eyebolt 88 depending from the underside of top plate 30; see FIG. 7. Thus spring 86 exerts an upward pull to elevate the pedal bars 80, bar 79, bolt link 65, plate 64, and bars 60ª, 60ᵇ.

On the inner or forward side of plate 50 held by bolts 99 is a female mold member 100. This mold member is a hollow container to which are attached nipples 102, 103 for circulating water L' therethrough. Pipes 102', 103' are attached to nipples 102, 103 respectively. The pipes 33', 102' terminate in a Y fitting 104, for receiving water from supply pipe 106 which passes through rear wall 27 of the base 22; see FIG. 7. Pipes 34' 103' are connected to Y fitting 105 to which waste water pipe 107 is connected at the rear wall 27.

Mold member 100 has a cavity 110 formed in its outer side or underside 112. Around this cavity may be provided a ridge 114. Coil springs 53 normally hold plate 50 in an open position as previously mentioned. However, these springs have an over-center mounting so that when the plate 50 is lowered to closed position as shown in FIG. 1, the springs 53, with plate 50 serving as a lever, constitute part of spring pressed means to help hold the plate down to exert some pressure on the bottom mold member 32.

The mold plate 44 can be disposed in a fully closed position over mold member 32 as shown in FIG. 6. The mold plate 44 can also be rotated to a rearwardly extending open position as indicated by dotted lines in FIG. 7 out of the way of mold members 32 and 100, which can then oppose each other with member 100 overlaying member 32. The cavities 36 and 110 will then oppose each other to define the outer side of a candy figure to be formed therebetween.

Figure 12:
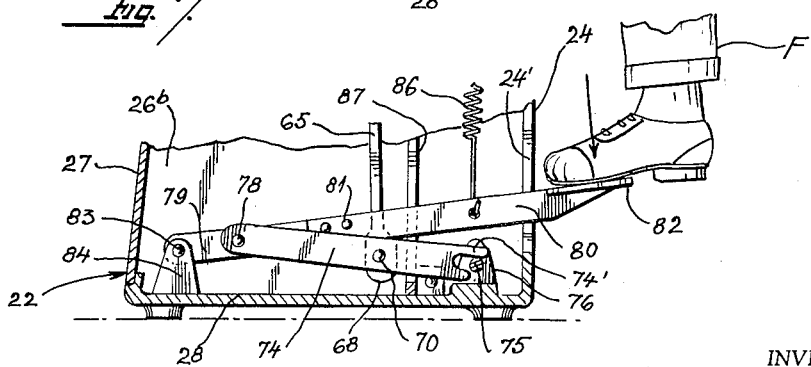
FIG. 12 is a sectional view similar to a part of FIG. 7 showing another step in operation of the machine.
Figure 11:
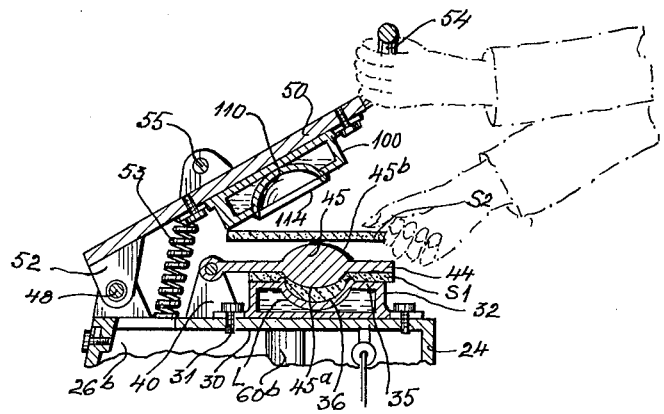
FIG. 11 is a sectional view similar to a part of FIG. 7 showing a step in operation of the machine.

In operation of the machine, an operator places a warm, pliable confectionery sheet S1 on top of mold member 32 as indicated in FIG. 7. Then the open mold plate 44 is turned down on the sheet S1. Male mold element 45ª presses a portion of the sheet S1 into the mold cavity 36. Then a second confectionery sheet S2 is placed on top of the mold plate overlaying mold element 45ᵇ as indicated in FIG. 11. The mold member 100 is then brought down on the sheet S2 by manually pulling down on handle 54 which lowers plate 50. Mold element 45ᵇ presses a central portion of sheet S2 up into the mold cavity 110 of mold member 100. Springs 53 exert some downward pressure, but additional pressure is required to complete the molding of the sheets S1, S2 and to sever excess sheet material from the molded sheet portions. This is accomplished by pedal pressure exerted by the operator's foot F downwardly on pedal 82, as shown in FIG. 12. The lever assembly 79, 80 is lowered along with link 74, link bar 65, plate 64, arms 60ª, 60ᵇ and plate 50. The ridges 37 and 114 cut through the sheets S1, S2 to sever excess sheet material from the sheet material inside the mold cavities. The fingers 74' on links 74 slide along the pin 75 during depression of the pedal 82 to complete the molding and severance of sheets S1, S2.

The pedal pressure is then released and mold member 100 is then raised by upward manual movement of handle 54. The relative movement between shaft 48 and mold 100 permits the opening and closing operations of the mold. The molded portion of sheet material P1 remains inside the mold cavity 110. The mold plate 44 separates from the molded portion P1. The mold plate 44 is then pivoted upwardly and rearwardly away from mold member 32 to the dotted line position of FIG. 7. This leaves molded portion P2 of the sheet material in mold cavity 36. The separation of the mold plate 44 from the molded sheet material can be facilitated by lightly oiling both sides of mold body 45. Now the mold member 100 is again brought down over mold member 32, this time to the position of FIG. 13 without plate 44 being interposed between the mold members. The free edges of the molded portions P1, P2 abut each other inside the confronting mold cavities and fuse to each other as pedal pressure is again applied to pedal 82. The circulation of cold water through the mold members effects a setting and hardening of the thermoplastic confectionery sheet material.

Circulation of the cold water should be withheld during the first lowering of the mold member 100 so that the warm, plastic sheets S1, S2 remain in a pliable condition until the mold plate 44 is removed and the mold members 32, 100 again confront each other. After the molded sheet portions P1, P2 harden and fuse to each other they form a completed molded candy figure A shown in FIGS. 4 and 5. The plate 50 can then be raised and the figure A will be removed from mold member 32.

FIG. 3 shows the molded confectionery sheet portions P1, P2 prior to fusing of their edges. FIG. 2 shows a confectionery sheet S prior to being inserted into the machine for molding.

Figure 14:
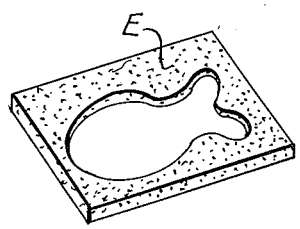
FIG. 14 is a perspective view of an excess confectionery piece produced during operation of the machine.
Figure 13:
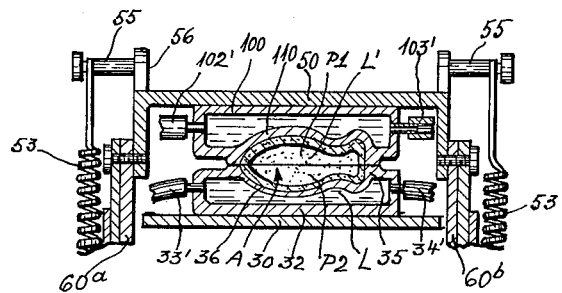
FIG. 13 is a sectional view similar to a part of FIG. 6 showing a further step in operation of the machine.

FIG. 14 shows excess material E of a confectionery sheet as cut off during the molding operation of sheet portions P1, P2. This material E can be melted or reworked with other such confectionery pieces to form new sheets S.

It is also possible to use the machine to make candy figures from hard cold candy sheets. In this case, hot water will be circulated through the mold members and the hard candy sheets S1, S2 will soften in the heated mold members. Then the two warm molded sheet portions P1, P2 can be fused together in the final step of machine operation by circulating cold water through the mold members. The hardened candy figure A will then be removed from the machine.

The invention thus provides an easily operable machine for manufacturing candy figures from pliable, fusible confectionery sheets. The machine is durable in construction and is capable of quite high production with a minimum of hand labor.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. In a machine for making molded candy figures from confectionery sheets, a stationary first female mold member having a first cavity therein for receiving a first portion of a first pliable confectionery sheet, a mold plate pivotably mounted near said mold member for overlaying the same in one position of the plate and for clearing the mold member in another position of the plate, said mold plate having a mold body with two male mold elements extending outwardly of opposite sides of the mold plate, one of said mold elements fitting into said cavity for molding said confectionery sheet portion therein in said one position of the plate, a second female mold member having a second cavity therein for receiving a portion of a second pliable confectionery sheet, spring-pressed means including a lever movably carrying said second female mold member to overlay the first mold member in one position thereof and to clear the first mold member and mold plate in a second position thereof, and lever operated means for pressing the first and second mold members together with the mold plate therebetween in said one position thereof and with the mold plate absent therefrom in the other position of the mold plate, the other of said mold elements extending into the second cavity for molding a second confectionery sheet portion therein when the mold plate is in said one position thereof, said lever operated means including a lever and an actuating pedal on said second-named lever operable by an operator's foot to leave the operator's hands free for placing confectionery sheets between the mold members, raising and lowering said second female mold member, pivoting the mold plate, and removing the formed candy figure.

2. In a machine for making molded candy figures from confectionery sheets, a stationary first female mold member having a first cavity therein for receiving a first portion of a first pliable confectionery sheet, a mold plate pivotably mounted near said mold member for overlaying the same in one position of the plate and for clearing the mold member in another position of the plate, said mold plate having a mold body with two male mold elements extending outwardly of opposite sides of the mold plate, one of said mold elements fitting into said cavity for molding said confectionery sheet portion therein in said one position of the plate, a second female mold member having a second cavity therein for receiving a portion of a second pliable confectionery sheet, spring-pressed means including a lever movably carrying said second female mold member to overlay the first mold member in one position thereof and to clear the first mold member and mold plate in a second position thereof, and lever operated means for pressing the first and second mold members together with the mold plate therebetween in said one position thereof and with the mold plate absent therefrom in the other position of the mold plate, the other of said mold elements extending into the second cavity for molding a second confectionery sheet portion therein when the mold plate is in said one position thereof, said mold members having ridges around the cavities therein for cutting off excess sheet material from the molded sheet portions when the mold members are pressed together with the mold plate therebetween, each of said mold members being a hollow container for liquid, and means for circulating cold water through the mold members while the mold members are pressed together and contain the first and second molded confectionery sheet portions to fuse registering edges of the sheet portions together to make a candy figure, said lever operated means including a lever and an actuating pedal on said second-named lever operable by an operator's foot to leave the operator's hands free for placing confectionery sheets between the mold members, raising and lowering said second female mold member, pivoting the mold plate, and removing the formed candy figure.

References Cited by the Examiner
UNITED STATES PATENTS

| | | | |
|---|---|---|---|
| 1,400,146 | 12/21 | Eggers et al. | 156—245 X |
| 1,971,849 | 8/34 | Brundage | 18—35 X |
| 2,253,291 | 8/41 | Fraknoi | 156—245 X |
| 2,370,294 | 2/45 | Dodge | 18—35 |

ROBERT E. PULFREY, *Primary Examiner.*

CHARLES A. WILLMUTH, *Examiner.*